April 9, 1935. J. S. BENNETT 1,996,895
GYROSCOPICALLY CONTROLLED DIRECTIONAL INDICATOR FOR AIRCRAFT
Filed July 2, 1931 2 Sheets-Sheet 1
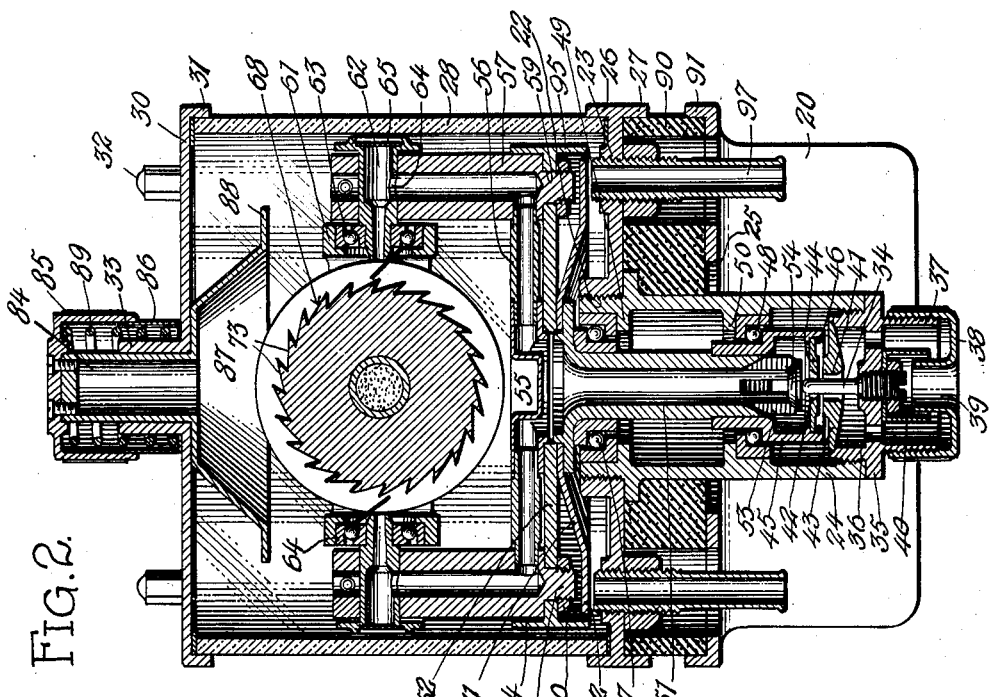
INVENTOR
JOSEPH S. BENNET,
BY his ATTORNEY April 9, 1935. J. S. BENNETT 1,996,895
GYROSCOPICALLY CONTROLLED DIRECTIONAL INDICATOR FOR AIRCRAFT
Filed July 2, 1931  2 Sheets-Sheet 2
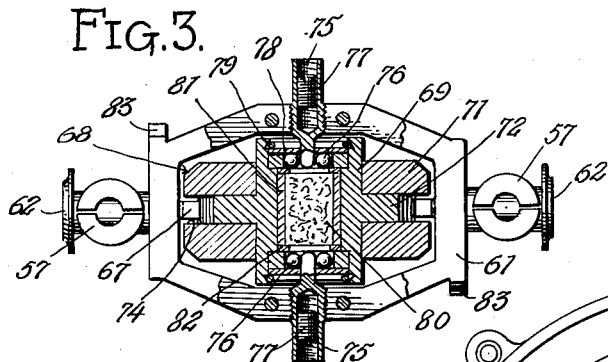
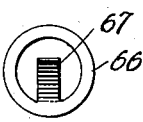
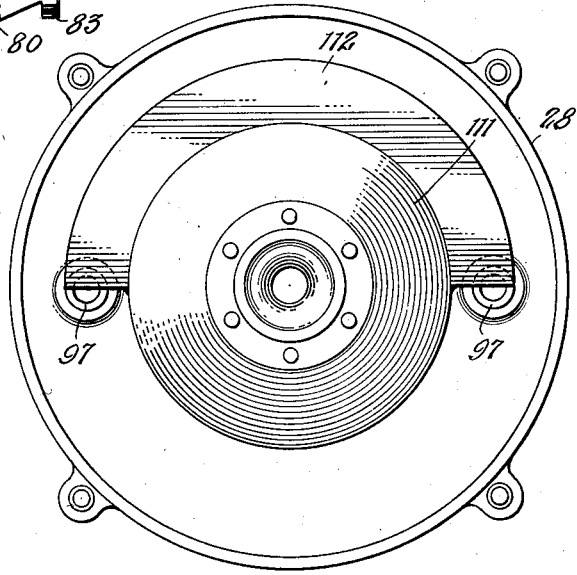
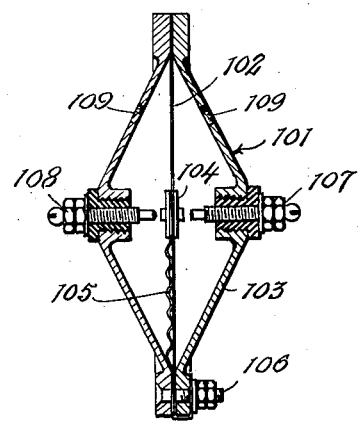
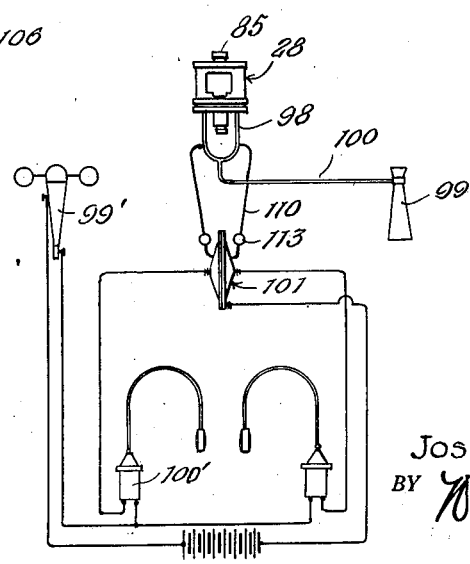
INVENTOR.
JOSEPH S. BENNET.
BY
ATTORNEYS.

Patented Apr. 9, 1935

1,996,895

UNITED STATES PATENT OFFICE 1,996,895

GYROSCOPICALLY CONTROLLED DIRECTIONAL INDICATOR FOR AIRCRAFT

Joseph S. Bennett, Bradford, Pa.

Application July 2, 1931, Serial No. 548,369

26 Claims. (Cl. 33—204)

My invention relates to navigating instruments and more particularly to gyroscopically controlled directional indicators for aircraft.

The determination and maintenance of the heading of an aeroplane has always been one of the difficult problems of flying. Due to the low directive force of the earth's field, the magnetic compass can only be relied upon when the aeroplane or other craft is steady in the air, not only directionally, but also with respect to disturbances produced by atmospheric conditions. In general, the practice with a magnetic compass is to steady the aeroplane near the desired compass heading, wait until the compass card has come to rest, and then attempt to correct for any discrepancy. This procedure involves exterior markings or the use of some gyroscopic turn index; for magnetic compass oscillations will not dampen out as long as the aeroplane is moving in azimuth. If the magnetic compass could be held on its azimuth without swinging or oscillation, the problem would be comparatively simple, and the desired course could be picked up and maintained simply by keeping the lubber line opposite the desired heading.

The directional indicator of the present invention is essentially a so-called "directional gyro". It has no meridian seeking properties and therefore must be occassionally checked and reset in accordance with the heading as given by the magnetic compass. Unlike the magnetic compass, however, it does not oscillate on turns or in rough air. If used with an instrument such as the "Sperry Horizon", it allows a pilot to perform all essential manoeuvers without exterior visibility. Basically it is an aeroplane navigating instrument for indicating to the pilot the compass course of the aeroplane. It is designed for accuracy and reliability and is possessed of attributes not to be found in similar instruments heretofore provided.

The fundamental object of the invention is to improve upon that type of navigating instrument known as the "Sperry" directional gyro.

A further object of the invention is to so construct the instrument as to admit of the automatic operation of suitable electrical contacts for a purpose to be hereinafter set forth.

A further object of the invention is to reduce to an absolute minimum both friction and inertia forces.

A further object of the invention is to so construct the instrument as to admit of the gyro wheel being driven, regardless of its angular position, by two jets of air acting at diametrically opposite points and at all times in the plane of the center of gravity of the wheel and its supporting gimbal.

A further object of the invention is to provide an instrument of the type indicated which can be readily dismantled and reassembled.

A further object of the invention is to provide a symmetrically balanced gyroscopic unit having an improved type cushioning support.

A further object of the invention is to provide for the gyro wheel a freely rotatable gimbal, said gimbal, at its opposite ends, being so formed and constructed as to admit of its being caged and brought to neutral, regardless of its position, by means of a simplified and improved type caging unit.

A further object of the invention is to so organize the parts comprising the improved type caging unit as to prevent at all times injury to the instrument thru careless or rough handling of the caging device.

A still further object of the invention is to provide for the instrument an improved arrangement giving adequate, dependable and continuous lubrication.

A still further object of the invention is to so construct the main support member for the moving assembly of the instrument as to admit of the indication thereon of the graduated azimuth scale.

A still further object of the invention is to render the reading of the instrument less exacting, quicker and more accurate than heretofore.

A still further object of the invention is to provide a more satisfactory means for filtering all air entering the instrument casing.

Other and further objects and advantages of the invention will be hereinafter more fully set forth.

In the drawings:

Fig. 1 is a front elevation of the instrument per se;

Fig. 2 is a longitudinal vertical sectional view;

Fig. 3 is a part plan and part sectional view of the gyro wheel and its gimbal;

Figs. 4 and 5 are detail views showing the construction of one of the air deflector parts or pieces;

Fig. 6 is a plan view of the disc by means of which the operation of the electrical contact unit is controlled;

Fig. 7 is a longitudinal vertical sectional view of the electrical contact unit, and Fig. 8 is a diagrammatic view showing the relation of the instrument to that type signal system forming a part of application Serial Number 463,077 filed June 23, 1930.

Generally speaking the instrument herein disclosed comprises, or rather includes, a suitable casing having formed therein a so-called window opening. Inside the casing, and operatively associated with the azimuth scale, is an air driven gyroscope with its axis horizontal, operated by suction from a venturi. The gyroscopic wheel is supported in a gimbal so that the aeroplane may turn freely about it in azimuth. Sufficient angular freedom is available in all directions so that the gyro may remain horizontal irrespective of all manoeuvers. At the top of the casing there is provided a setting-knob or caging control unit. When the knob is pressed down the gyro is "caged" and its supporting gimbal held horizontal. Turning the knob will turn the scale until it indicates the desired compass course. The knob, when released, springs slowly back to its original position, and the gyro remains with its azimuth in the position at which it was set. This setting of the gyro will maintain for a period anywhere from twenty to thirty minutes with substantial accuracy. From time to time, as experience teaches, the gyro should be checked against the compass and reset if drift has occurred in the interval. In practice the instrument may be used exactly as a compass except that, unlike the compass, it is unaffected by rough air and violent manoeuvers. By periodically resetting the instrument thru the caging of the gyro unit to make it correspond to the desired magnetic compass course or known geographical heading, flight in the desired direction may be indefinitely maintained.

Referring particularly to the drawings, and especially to Figs. 1 and 2, 20 designates a suitable bracket upon which the instrument in its entirety is adapted to rest. The instrument per se comprises a base plate 21 having formed therein a central interiorly threaded opening 22 and smaller interiorly threaded side openings 23—23. Within the central opening 22 is threaded a depending open end substantially cylindrical casing part 24. Said casing part, at its lower end, is adapted to receive a bodily removable unit upon which, as hereinafter more fully explained, the weight mass of the moving assembly of the instrument is entirely borne. To admit of the placement and removal of said casing part, the bracket 20 has formed therein a central opening 25 thru which said casing part extends.

Upon the outer edge of the base plate 21 oppositely extending annular flanges 26 and 27 are formed. Within the embrace of the upstanding flange 26, and resting on the base plate 21, is the main casing or housing 28 of the instrument. Said casing 28 is preferably formed of a transparent material, such as glass, entirely frosted upon its exterior cylindrical surface, except for a so-called window opening 29. Thru said window opening the azimuth scale and the indicating element, later to be described, are clearly visible from directly in front and from a very considerable angle off center.

A cover 30, having a marginal flange 31, extending in a direction opposite to that of the flange 26, is provided for the casing 28. By means of three, four or more cover bolts 32, fastened to the base plate 21, the cover, and hence the casing 28, is held firmly in place. A sleeve-like extension 33 providing a suitable bearing is formed on the cover in axial alignment with the central opening 22 of the base plate.

The moving assembly of the instrument, as previously intimated, is encased for the major part within the casing 28. To support the weight of said assembly a vertically extending bearing pivot 34 is adjustably mounted in a closure member 35 threaded in the lower open end of the casing part 24. Said closure member has formed thereon a downwardly extending exteriorly threaded cylindrical extension 37 over which is screwed a cap 38. Thru an opening formed within said cap air is admitted to the casing.

Surrounding the opening in the cap 38 is an upstanding sleeve-like extension 39 by means of which the air entering thru the cap opening is guided toward and against a suitable baffle 40. Said baffle 40 is nothing more nor less than an inverted substantially cup-shaped member held in place by the bearing pivot 34 against the underside of the closure member 35. The openings 36 are preferably spaced radially about said cup-shaped member so that the air in entering thru the cap opening is made to twice reverse its direction of flow before said openings 36 are reached. A heavy film of oil or grease is provided within and at the bottom of the cap 38 to act as a filter or trap for cleansing the in-rushing air.

From the openings 36 the air entering the casing 28 is made to flow thru a choked orifice shaped to simulate or produce in effect a Venturi passage. Said Venturi passage is established by the provision of suitably shaped openings 41 and 42 formed in a disc 43 and a disc 44 respectively. The disc 43 is mounted to bear on the inner end of the closure member 35, whereas the disc 44 is held firmly against the lower end of the bearing sleeve 45 by means of a removable lock wire 46. In increasing the air speed thru the action of the venturi a negative pressure is produced within the casing at 24 to prevent leakage in and around the space between the discs 43 and 44. The size of the Venturi passage is preferably such that the bearing pivot 34 may extend vertically therethru to support upon its rounded and hardened upper end the weight mass of the moving instrument assembly. The fact that the disc 44 is freely rotatable with respect to its associated disc 43 will in no way affect the operativeness of the Venturi passage.

On the inside of the casing 24, at suitable intervals of space, are anti-friction ball bearings 47 and 48. Suffice it to say that the bearings (calling for the use of spacers and a minimum number of balls) have been made as light and as frictionless as possible. Shoulders 49 and 50 formed on the inner wall of the casing part 24, hold the bearings 47 and 48 in place.

To the end that the entire weight mass of the moving assembly of the instrument may be borne on the end of the pivot bearing 34, said assembly is provided with a vertical hollow shaft 51 upon the upper widened end of which the main support member or turntable 52 of said assembly is mounted. At its opposite or lower end said shaft is milled to provide a plurality of radially disposed slots or elongated air passages 53, and is further provided with a hardened button or disc 54 with which the upper hardened end of the bearing pivot 34 makes contact. From the Venturi passage above referred to, air is directed around the periphery of the button 54, thru the slots 53, and into the hollow of the vertical shaft 51.

At the upper widened end of the shaft 51, and open to the hollow thereof, there is provided a two-way union 55. From the diametrically opposed portions of said union horizontal tubes 56—56 extend. These tubes 56—56 at their outer ends are fitted, one each, in the lower ends of two upright gimbal supports 57—57 carried by the main support member or turntable 52 of the instrument and, since each upright is hollow, the air entering the shaft 51 is directed toward and into the tubes 56—56, and by said tubes carried to the hollow uprights. That the uprights may be rigidly supported in vertical position, each, at its lower end, has formed thereon a threaded extension 58. Said extensions engage in openings 59 formed in the turntable and are held fast by nuts 60.

Between the uprights 57—57 a gimbal 61 is mounted for rotation about a substantially horizontal axis. The mounting for said gimbal comprises two hollow pivots 62—62 engaging in ball bearings 63—63 seated in recesses 64—64 formed in the ends of the gimbal. The hollow pivots are carried by the uprights 57—57, and each, intermediately of its ends, has formed therein an opening 64' which registers with the hollow of the uprights. Thus constructed, all air entering the hollow uprights is directed inwardly and at diametrically opposite points onto the periphery of the gyro wheel or rotor. Buttons 65—65, snapped in place, close the outer ends of the hollow pivots, and the pivots, due to the shape of the hollows thereof, provide in effect suitable air jets or nozzles. Adjacent each jet or nozzle a deflector piece is mounted. Preferably each deflector piece consists of a ring 66 (see Figs. 4 and 5) having a tongue 67 extending off therefrom at an angle.

The rotor or gyro wheel designated in its entirety as 68 is carried by the gimbal 61. In its preferred embodiment it comprises a hollow hub portion 69 and balanced side portions 71—71. The hollow hub portion 69 has formed on its exterior surface an annular flange or enlargement 72, which said flange, upon its periphery, has formed therein a plurality of uniformly spaced vanes or buckets 73. The side portions 71—71 are preferably shrunk or otherwise fastened on said hub portion and engage said flange, one on either side thereof. To better confine the air jets directed toward said buckets, the side portions 71—71 have a diameter exceeding that of the flange. In other words, the vanes or buckets 73 are located at the base of a groove 74 extending circumferentially around the rotor. The air jets, it should be noted, contact at all times the rotor or gyro wheel in the plane of its rotation axis. This is desirable both in the interest of perfect balance and in maintaining, under all operating conditions, a uniformly applied and symmetrically distributed driving force.

The mounting for the gyro wheel 68 is best illustrated in Fig. 3. At opposite sides of and within the gimbal 61 threaded openings are formed. Within said openings, and extending toward each other, are axially adjustable pivot pins 75—75. These pins 75—75 engage in ball bearings 76—76 seated in recesses formed in the opposite ends of the hub portion 69 of the rotor. To secure perfect balance, each pin 75 is hollow and interiorly threaded to admit of the fitting engagement therein of suitable plugs 77—77 which can be threaded either in or out as desired.

Washers 78—78, held by lock wires 79—79, hold the ball bearings 76—76 in place.

It is essential in a delicate instrument such as a directional gyro that the rotor or gyro wheel shall have ample and constant lubrication. To this end the hub portion 69 of the rotor is hollowed out. Within said hollowed out portion an oil wick 80 is fitted. Surrounding said wick is a bushing 81, the ends of which are flush, except for the thickness of washers 82—82, with shoulders formed at the base of the ball bearing receiving recesses. To remove the ball bearings pressure may be exerted on either end of the bushing 81 after having first removed the lock wires 79—79. From the wick 80 oil is fed onto the bearings 76—76 and the pivot pins 75—75. Cam surfaces 83—83 formed, one upon each edge at the opposite ends respectively of the gimbal 61, act, in a caging operation, to turn the gimbal, and hence the rotor, back to neutral, i. e., to the position indicated in Fig. 2, regardless of its angular displacement. There is nothing whatsoever to interfere in any way with the complete rotation of the gimbal relatively to its support.

The so-called caging unit is mounted on the cover 30 for the casing 28. It includes a stem portion 84, a hollow knob 85, a sleeve 86, and a substantially dome-shaped member 87. The dome 87 is fitted inside the casing 28 and is adapted normally to bear on the underside of the cover 30. Around its lower edge a horizontally flat annular flange 88 is formed. Said flange, when the dome is depressed or pushed down, is brought into engagement with one or the other of the cam surfaces 83—83. Said surfaces, thus acted upon, and due to the pressure exerted thereon, automatically cause the gimbal 61 to assume a horizontal position. Having been thus positioned, the gimbal 61 can be freely rotated, along with the turntable 52, by simply rotating the knob. The friction contact between said parts admits of such rotation.

The stem 84 of the dome 87 is journaled in the bearing 33. At its outer or upper end it extends beyond the corresponding end of said bearing. To said extended end the knob 85 is fastened. The size of the knob is preferably such that the sleeve 86 will telescope thereinto. Jointly said knob and sleeve receive within the embrace thereof a spiral spring 89 bearing at its opposite ends on the turned-in lower end of the sleeve and the undersurface of the knob respectively. Said spring, it will be noted, encircles the bearing 33, and hence the stem 84, and is adapted, when the knob is depressed, to slowly return, when released, both the knob 85 and the dome 87 to their normal raised position. Preferably the fit between the mating parts 85—86 is such that an air cushion is established, tending at all times, to prevent injury to the caging unit thru improper or rough and careless handling.

To absorb and dissipate any and all shocks and vibrations to which the instrument would otherwise be subjected, the casing 28 is mounted on a suitable cushion 90, preferably of sponge rubber. Said pad or cushion is flat and circular and corresponds in size with the size of the base plate 21 beneath which it is fitted. The flange 27 of the base plate and an oppositely extending flange 91 formed on the edge of the bracket 20, hold said cushion against lateral slippage. Springs 92, of which any suitable number may be provided, yieldingly hold the base plate, and hence the instrument, upon its support.

Instead of a relatively small diameter scale, characteristic of prior instruments, the azimuth scale 93 of the present invention is of maximum diameter. It is indicated on the periphery of the turntable 52. That this may be satisfactorily accomplished said periphery is very appreciably widened and the turntable strengthened by the provision of opposed flanges 94 and 95 upon which said markings appear. Preferably the scale markings are arbitrary and more or less widely spaced rather than those of the ordinary magnetic compass. The scale, it will be observed, extends crosswise the window, at or near its bottom edge.

To render the reading of the instrument less exacting, quicker, and entirely accurate, a post 96 and a pointer 96' are provided. Both said indicating elements are prominently displayed, and as the turntable is rotated, one said part or element is movable relatively to the other. For convenience in mounting, the pointer 96' is fastened to the cover 30, whereas the post 96 is fastened to the turntable 52 in vertical alignment with the zero marking on the azimuth scale.

Rotation of the gyro wheel is effected by means of the air in circulation within the casing 28. On the underside of the base plate 21, and fitting in the threaded openings 23—23 thereof, there is provided a pair of diametrically opposed exhaust tubes 97—97. Over the outer ends of said tubes 97—97 (see Fig. 8) branch tubes 98—98 are fitted. A venturi 99 having a tube connection 100 with the branch tubes 98—98 acts in a well known manner to exhaust by suction the air from the instrument casing. As previously set forth, the air entering the casing is directed onto the gyro wheel thru the jets or nozzles located at diametrically opposite points.

The provision of two, instead of one suction outlet, makes it entirely practical to automatically operate an electrical contact unit such as that illustrated in Fig. 7. In application Serial Number 463,077 filed June 23, 1930 there is disclosed an improved type signaling device or system acting on the tactile senses of the pilot. It is highly desirable that the present invention shall be made available to satisfactorily operate said signaling system. Briefly, said signaling system includes a wind driven circuit interrupter 99', vibratory weighted signaling devices 100' and an electrical contact unit 101. In Fig. 8 the electrical circuit and the signaling system of which it forms a part, is diagrammatically shown. In said co-pending application the details of the signaling system are fully disclosed. Suffice it to say, therefore, that the herein described instrument is especially designed and eminently suited to the automatic operation of said signaling system.

Referring to Fig. 7, 102 designates a rubberized diaphragm sufficiently flexible to admit of its displacement upon the application of unequal pressures on its opposite sides. Said diaphragm is fastened within and is adapted to extend across a suitable casing 103. In the center, and on opposite sides of said diaphragm, contacts 104—104 are fastened. From said contacts a conductor 105 is carried to a terminal post 106. The casing 103 is also provided with terminal posts 107 and 108, one for each said contact, and on its opposite sides the diaphragm has formed therein openings 109—109 out from which tubes 110—110 extend. The tubes 110—110, at their opposite ends, are open to the branch tubes 98—98 which extend off from the suction outlets of the instrument. By varying the pressures in the respective tubes 110—110, the diaphragm is displaced, the electrical contacts opened and closed, and the signaling devices 100' properly activated.

To secure the desired difference in pressure within the branch tubes 98—98, and hence the tubes 110—110, the turntable 52 of the instrument has mounted therebeneath, and rotatable therewith, a disc 111 upon the periphery of which is carried a half circular blade or flange 112. Said flange 112, when the turntable 52 is positioned as indicated in Fig. 1, has its opposite ends so related to the exhaust jets or tubes 97—97 as to cover half only the inner and open ends thereof (see Fig. 6). Preferably said flange is spaced slightly above said openings and under no circumstances makes contact therewith. It will be seen, therefore, that the effective area of the open ends of said suction outlets vary as the disc 111 is turned. Such rotation of the disc is the means relied upon to bring about the difference in pressure on the opposite sides of the diaphragm 102. Needle valves 113—113, if desired, may be provided to manually adjust or regulate the sensitiveness of the contact unit.

By unscrewing the closure member 35, removing the lock wire 46 and disc or bearing end washer 44, and removing button 54, the whole movable assembly may be lifted bodily from the casing. Pivot bearing button 54 is not only a hardened bearing surface for the pivot 34, but also a locking device for itself and bearing sleeve 45. Bearing sleeve 45 is placed in assembled position by a light tap fit over the lower end of the shaft 51, after which the button 54 is forced into said open shaft end, thus spreading the milled portion thereof outwardly and locking the bearing sleeve in place.

The only parts added to the instrument to admit of the operation of the electrical contact unit 101 are the disc 111 and its associated flange 112, and two, instead of a single suction outlet 97. To use the instrument without the contact arrangement, it is only necessary to plug one of the suction outlets and adjust the other for a wider clearance at its upper end.

The manner in which the bearings 76 are mounted in the gyro wheel 68 is also believed to be a distinct improvement over prior practice. Heretofore it has been next to impossible to remove the ball races without damage to the gyro unit or some part of the moving assembly. In the present invention it is only necessary to remove the lock wire 79 and bearing washer 78. By then inserting a drift pin against the inner bearing washer 82 and exerting thereon a slight pressure, the ball race at the opposite end of the hub portion or the gyro wheel can be easily removed. In this connection it should be noted that the inner bearing washers 82 are of the same diameter as the bushing 81, and the combined length of the bushing 81 and washers 82, the same as the distance between the shoulders in the hub against which the races bear. Another feature of the invention of considerable importance is the jet and nozzle arrangement in its relation to the gyro wheel. By mounting the two jets at diametrically opposite points, the driving force, under all operating conditions, is exerted on the gyro wheel, in the plane of its center of gravity. Perfect balance, and a symmetrically applied driving action is in this way obtained.

The manner in which the parts 96 and 96' extend vertically across the window opening 29 is likewise important. The part 96 is fixed solid in its relation to the azimuth scale 93 at the zero point, and the part 96' is fixed solid in its relation to the casing 28 within which the scale revolves. In cross-section the indicator parts are of constant size from end to end (except for the inserted arrow) and, by contrast, stand out in bold relief at all times. Such contrast is still further accentuated by the soft light entering the frosted glass shell or cylinder within which the moving assembly is housed. In operation, the pilot, by watching the post 96, and manipulating the rudder of the aircraft, can maintain perfect directional control.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In a gyroscopic instrument, an assembly including a gyro wheel and a gimbal, a casing within which said assembly is enclosed, said assembly being mounted for full rotation about a substantially vertical axis, and a freely rotatable and axially movable caging unit for said assembly, said caging unit being axially movable to cage said gimbal and being freely rotatable to re-set said assembly once said gimbal is caged.

2. In a gyroscopic instrument, an assembly including a gyro wheel, a casing within which said assembly is enclosed, said assembly being mounted for full rotation about a substantially vertical axis, and a freely rotatable and axially movable caging unit for said assembly having an axis of rotation in coincidence with the rotation axis of said assembly, said caging unit being axially movable to cage said assembly and being freely rotatable to re-set said assembly once said assembly is caged.

3. In a gyroscopic instrument, an assembly including a gyro wheel and a gimbal, said gimbal being mounted for full rotation about a substantially horizontal axis, a casing within which said assembly is enclosed, and means operable to cage said gimbal regardless of its then angular position with respect to said casing, said means, with the gimbal caged, being adapted to straddle said gyro wheel.

4. In a gyroscopic instrument, a casing, a substantially vertical axis shaft enclosed within said casing, a substantially horizontally flat circular turntable mounted on said shaft, said turntable having indicated upon its periphery a compass scale, vertically spaced bearings within which said shaft is journaled for rotation, said bearings being disposed at one side only of said turntable, a gyro wheel enclosed within said casing, a mounting for said gyro wheel carried by said turntable, and cooperating indicator elements visible from without said casing through a window opening formed therein, said elements being extended substantially vertically across said opening and being fastened to said turntable and to said casing respectively.

5. In a gyroscopic instrument, a casing, a substantially vertical axis shaft enclosed within said casing, a substantially horizontally flat circular turntable mounted at one end of said shaft, said turntable having an overall outside diameter commensurate with the overall inside diameter of said casing and having indicated upon its periphery a full 360° compass scale, vertically spaced bearings within which said shaft is journaled for rotation, said bearings being disposed at one side only of said turntable, a gyro wheel enclosed within said casing, a mounting for said gyro wheel erected upon and wholly supported by said turntable, and cooperating indicator elements visible from without said casing through a window opening formed therein, said elements being fastened to said turntable in line with the zero marking of said scale and to said casing respectively.

6. In a gyroscopic instrument, a casing, a substantially vertical axis shaft enclosed within said casing, a turntable mounted on said shaft, a bearing pivot pin carried by said casing and bearing at one end upon one end of said shaft, vertically spaced journal bearings for said shaft intermediately located between said pivot pin and said turntable, a gyro wheel enclosed within said casing, and a mounting for said gyro wheel erected upon and wholly supported by said turntable.

7. In a gyroscopic instrument, a gyroscopically controlled assembly including a turntable, a gyro wheel, a substantially vertical axis shaft upon which said turntable is mounted, and a mounting for said gyro wheel erected upon and wholly supported by said turntable; a casing within which said assembly is enclosed, an axially adjustable pivot bearing pin carried by said casing and upon the end of which the weight mass of said assembly is borne, said pin being so disposed in its relation to said assembly as to engage with and bear directly upon one end of said shaft, and spaced journal bearings disposed about said shaft intermediately of its point of contact with said pivot pin and said turntable.

8. In an air-driven gyroscopic instrument, an assembly including a gyro wheel and a mounting therefor having formed therein a passage through which the air directed on to said wheel is drawn, a casing within which said assembly is enclosed, a vertical axis pivot bearing pin carried by said casing and upon which the weight mass of said assembly is borne, and means forming a Venturi passage intermediate said inlet opening and said first mentioned air passage through which said pivot bearing pin extends.

9. In a gyroscopic instrument, an assembly including a hollow split end shaft, a member fitted on said shaft adjacent to said split end, and means engaging in the hollow of said shaft to radially spread the split end thereof to hold said member against axial play.

10. In a gyroscopic instrument, an assembly including a hollow split end shaft, a bearing disk engaging in the hollow split end of said shaft, a casing within which said assembly is enclosed, and a bearing pivot pin carried by said casing and upon one end of which the weight mass of said assembly is borne, said disk providing an end closure for said hollow shaft upon which said pivot pin is adapted to bear.

11. In an instrument, a gyroscopic assembly, a casing within which said assembly is enclosed, a freely rotatable unit carried by said casing and movable axially to engage and thereby cage said assembly, and means to re-set said assembly by rotating said unit when said assembly is caged.

12. In a gyroscopic instrument, an assembly including a turntable and a supporting shaft, said turntable being mounted at one end of said shaft, a casing within which said assembly is enclosed, and a caging device for said assembly mounted within said casing on the opposite side of said turntable from said supporting shaft, said caging device being movable axially toward said assembly in substantial coincidence with the extended axis of rotation of said shaft to engage and cage said assembly.

13. In a gyroscopic instrument, a casing, a substantially vertical axis shaft enclosed within said casing, a turntable mounted on said shaft, said turntable having indicated upon its periphery a full 360° compass scale, vertically spaced bearings within which said shaft is journaled for rotation, said bearings being disposed at one side only of said turntable, a gyro wheel enclosed within said casing, a mounting for said gyro wheel erected upon and wholly supported by said turntable, and cooperating indicator elements visible from without said casing through a window opening formed therein, said elements being fastened to said turntable and to said casing respectively.

14. In a gyroscopic instrument, a freely rotable gyroscopic assembly, and a freely rotatable and axially movable caging unit for said assembly, said caging unit being axially movable to cage said assembly and being rotatably movable to re-set said assembly once said assembly is caged.

15. In a gyroscopic instrument, an assembly including a gyro wheel and a gimbal freely rotatable throughout a full 360° said gimbal, under certain operating conditions, being adapted to rotate and hence deviate from that position which it is caused to assume when caged, a relatively flat bearing surface formed upon said gimbal and against which the caging means is adapted to bear when said assembly is caged, a cam surface formed upon and inclined to the plane of the bearing surface of said gimbal, and a caging means for said assembly movable into and out of caging contact with said bearing surface, said caging means in its movement toward said bearing surface and by its bearing contact on said cam, being adapted to rotate said gimbal to its caged position should it (the gimbal) at the time have deviated from that position it is caused to assume when caged.

16. In a gyroscopic instrument, a casing, a turntable mounted within said casing for rotation about a substantially vertical axis, uprights erected upon and wholly supported by said turntable, a gimbal journaled for rotation between said uprights, a gyro wheel mounted in said gimbal, cam surfaces formed upon said gimbal one each at opposite sides of the gyro wheel, a caging device within said casing adapted normally to occupy a position out of contact with said gimbal, said caging device in a caging operation being movable to engage one or the other of said cam surfaces to return said gimbal to its caged position should it (the gimbal) at the time have deviated from that position it is caused to assume when caged, and means operable from without said casing to move said caging device at will.

17. In a gyroscopic instrument, a turntable rotatable about a substantially vertical axis, a gimbal mounted upon said turntable for full rotation about a substantially horizontal axis, a gyro wheel mounted in said gimbal for spinning about an axis normal to said gimbal axis, cam surfaces fixed to move with said gimbal, said cam surfaces being disposed one each at opposite sides of the gyro wheel, a caging device adapted normally to occupy a position out of contact with said gimbal, said caging device in a caging operation being axially movable to engage one or the other of said cam surfaces to return said gimbal to its caged position should it (the gimbal) at the time have deviated from that position it is caused to assume when caged, and means operable to move said caging device at will.

18. In a gyroscopic instrument, a casing, a gyroscopic assembly including a gyro wheel and a gimbal within the embrace of which said wheel is mounted for rotation, said assembly being enclosed within said casing, cam surfaces fixed to move with said gimbal, said cam surfaces being disposed one each at opposite sides of the gyro wheel and inclined to the plane of said gimbal, a caging device movable within said casing toward and from said gimbal, said caging device in a caging operation being adapted to contact one or the other of said cam surfaces to return said gimbal to its caged position should it (the gimbal) at the time have deviated from that position it is caused to assume when caged, means associated with said caging device adapted to at all times urge said device toward a non-caging position, and means operable from without said casing to move said caging device at will.

19. In a gyroscopic instrument, a casing, a gyroscopic assembly including a gyro wheel and a gimbal within the embrace of which said wheel is mounted for rotation, said assembly being enclosed within said casing, a caging device for said assembly movable within said casing toward and from said gimbal, means carried by, fixed to move with and inclined to the plane of said gimbal and against which said caging device is adapted to bear in a caging operation, said means by its engagement with said caging device being adapted to restore said gimbal to its caged position should it (the gimbal) at the time have deviated from that position it is caused to assume when caged, means associated with said caging device adapted to at all times urge said device toward a non-caging position, and means operable from without said casing to move said device at will.

20. In a gyroscopic instrument, a casing, a gyroscopic assembly including a gyro wheel and a gimbal within the embrace of which said wheel is mounted for rotation, a device within said casing movable both axially and rotationally to respectively cage and re-set said assembly by contact with said gimbal, means associated with said device adapted normally to urge it toward a position out of contact with said gimbal, and means operable from without said casing to effect both axial and rotational movement of said device at will.

21. In a gyroscopic instrument, a gyroscopic assembly mounted for rotation about a substantially vertical axis, a casing within which said assembly is enclosed, a caging device within said casing above said assembly and movable axially into engagement therewith to cage said assembly means operable from without said casing to move said device toward said assembly at will, and means associated with said device for yieldingly urging it toward a non-caging position at all times.

22. In a gyroscopic instrument, a casing, said casing having formed therein a Venturi passage, a gyroscopic assembly enclosed within said casing, said assembly being freely rotatable about a substantially vertical axis, and a support for said assembly extended through and of a diameter less than the minimum diameter of said Venturi passage.

23. In a gyroscopic instrument, a casing, said casing having formed therein a Venturi air-passage, a gyroscopic assembly including an air driven gyro wheel and a hollow shaft through the hollow of which the air for driving said wheel is passed, and a support for said assembly mounted at one end of said shaft said support being extended through said Venturi passage without contact with the inner passage wall.

24. A gyroscopic instrument including a gyroscopic assembly and a casing within which said assembly is enclosed, a caging device for said assembly mounted within said casing and movable axially into and out of caging contact with said assembly, an operating member for said device disposed without said casing, and means interposed between the outer end of said member and said casing for pneumatically cushioning the movements of said device.

25. A gyroscopic instrument including a gyroscopic assembly and a casing within which said assembly is enclosed, a caging device for said assembly mounted within said casing, an operating member fastened to said caging device and disposed without said casing, a spring bearing at its opposite ends upon said operating member and upon the outer wall of said casing respectively, said spring being adapted normally to hold said caging device out of contact with said assembly, and a dash-pot assembly within which said spring is enclosed and by means of which all movements of said caging device are pneumatically cushioned.

26. In a gyroscopic instrument, an assembly including a gyro wheel and a gimbal mounted for full rotation about a substantially horizontal axis, separate cam surfaces inclined to the plane of and formed respectively at the opposite ends of said gimbal, said cam surfaces being disposed respectively on opposite sides of the gyro wheel, and a caging unit for said assembly movable into and out of engagement with said gimbal, said caging unit being adapted to bear upon one or the other of said cam surfaces to centralize and rotate said gimbal in a caging operation.

JOSEPH S. BENNETT.